United States Patent Office 3,329,009
Patented July 4, 1967

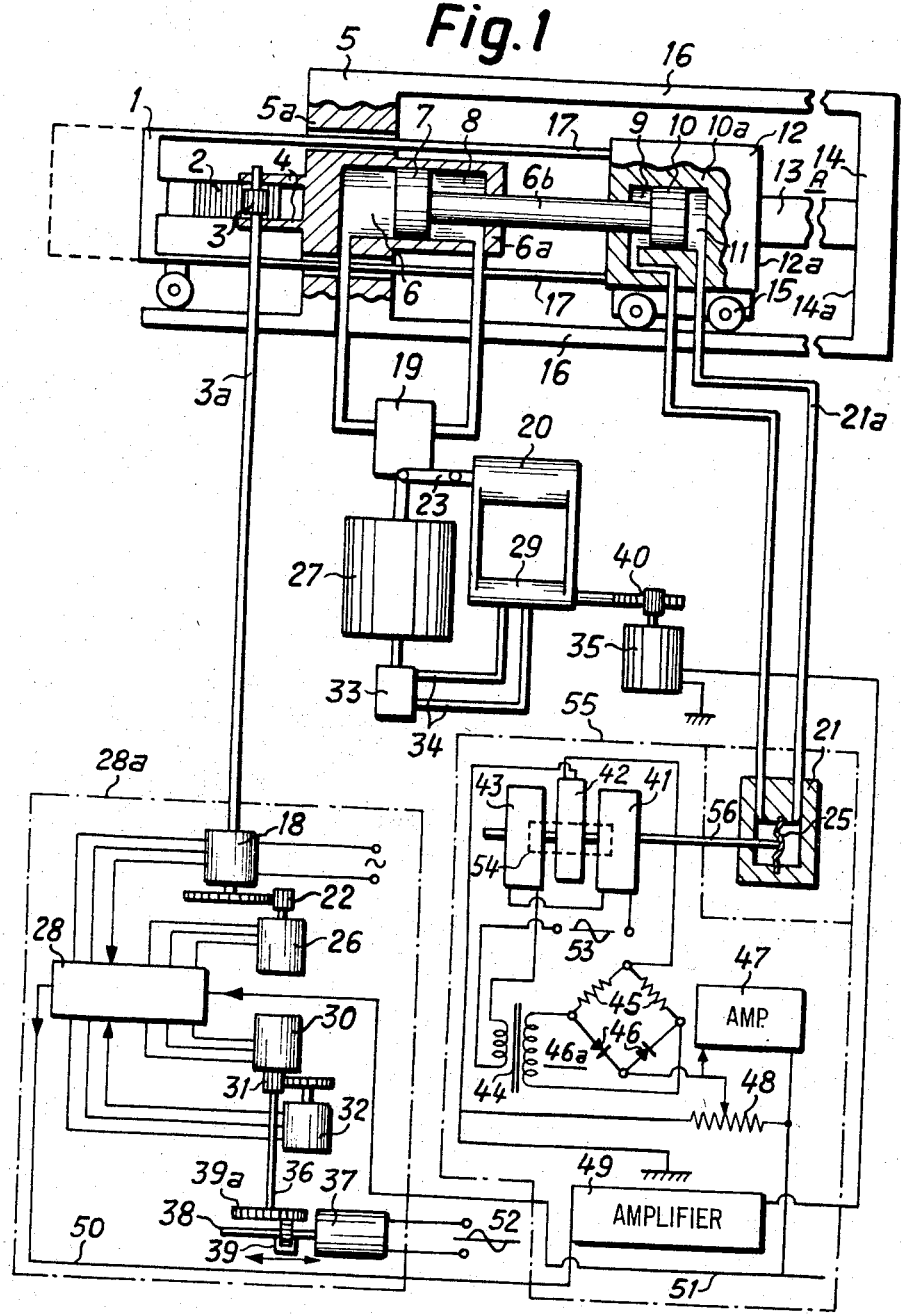

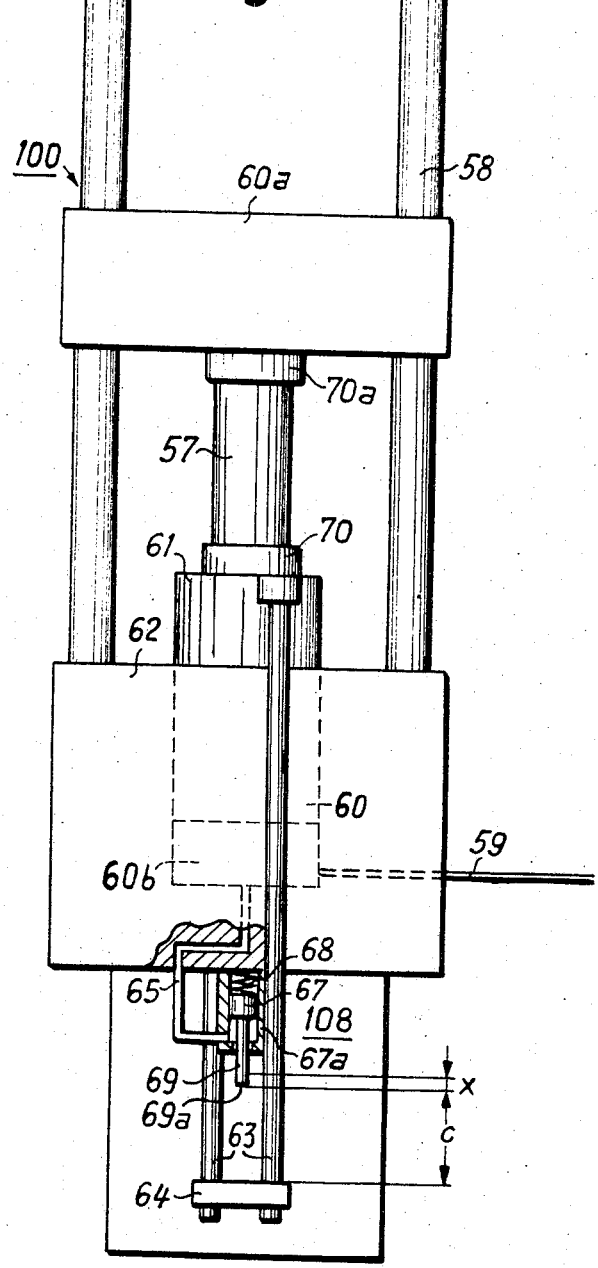

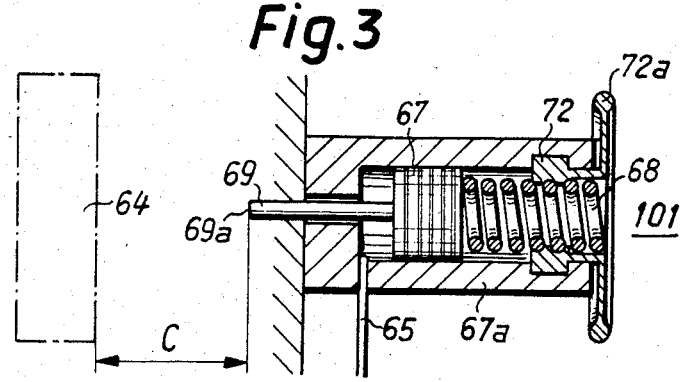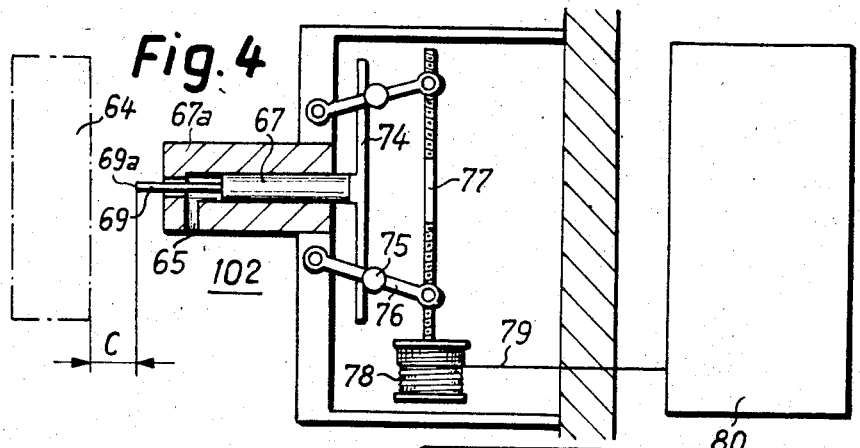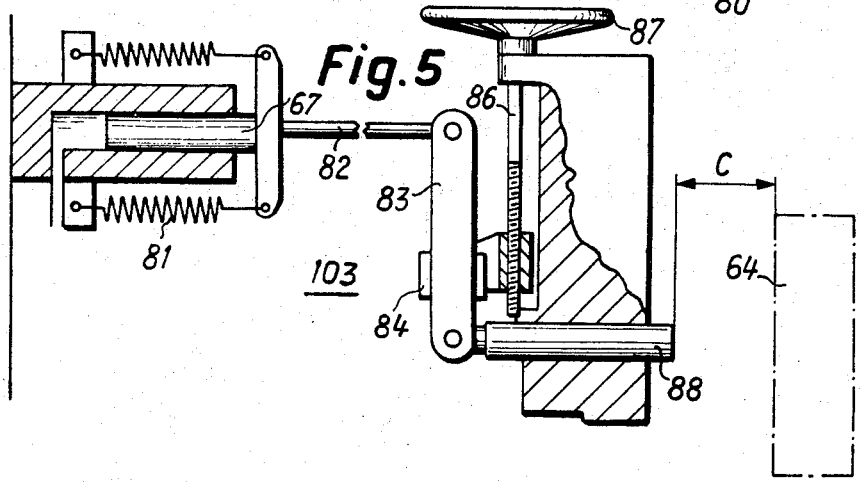

3,329,009
COMPENSATION APPARATUS AND METHOD FOR MACHINES, PARTICULARLY MATERIAL TESTING MACHINES
Jan Richard Peter de Fries, Zurich, Switzerland, assignor to Von Roll AG., Gerlafingen, Switzerland
Filed Sept. 16, 1963, Ser. No. 309,128
Claims priority, application Switzerland, Sept. 18, 1962, 11,000/62
21 Claims. (Cl. 73—88)

The present invention relates to an improved method and apparatus for compensation of the elastic deformation of the structural parts of a machine for the deformation of workpieces or specimens, in particular for a material testing machine.

One of the most important problems with which industry is faced, is to exactly determine the yield strength and plastic behavior of materials under load. Modern research is extensively preoccupied with the problem of understanding this behavior. The classical material testing machines generally lead to considerable errors when experimenting in the plastic range. The machine frame and hydraulic drive store considerable energy which may be released in uncontrolled manner during deformation of a test body while in the plastic range.

Thus, the method and apparatus according to the present invention is designed with the view of eliminating such unpredictable behavior of the test machine frame and/or drive.

With machines for the deformation of workpieces, specimens and the like, for example material testing machines, by means of which a workpiece or test piece is deformed under the influence of a test load or force, there arises the problem of measuring such deformation as accurately as possible. Thus, for example, it is conventional with press machines, tensile machines, compression machines and torsion machines to lead cords or similar expedients from the yokes or wallpieces moved by the deforming load to a stationary recording device which actuates a chart in such a manner that, the movement of the cord members corresponds to the X-coordinate, the dimension or magnitude of the force to the Y-coordinate. However, such apparatus have proven themselves in actual practice to be inaccurate. They do not take into consideration the elastic deformation of the machine standards or columns, and, in addition thereto, are subject to the inaccuracies attendent with cords or the like and the deviations or path deflections associated therewith.

Accordingly, a further important object of the present invention is to provide an improved apparatus for compensating for the elastic deformation of the structural components of a machine deformed by the test load, which for convenience in description have been collectively designated herein as the machine frame.

The problem of determining the true elongation at the test piece or workpiece becomes of special importance particularly with material testing machines, the rate of deformation of which must be maintained constant by controls within narrow limits. As is known, the greatest accuracies can be achieved when the measuring device for the elongation is arranged parallel to the test piece, preferably in such a manner that its axis coincides with the test axis. However, such would only be possible with hollow-body test pieces and, in each case, would require an accommodation to the different test bodies.

Hence, a further important object of the present invention is to provide improved apparatus for accurately determining the actual deformation of a workpiece or test piece irrespective of its shape.

It is a further primary object of the present invention to provide an improved method and apparatus which enables determination of the true deformation of a test piece or body which is to be deformed solely in a single machine, free from the elastic deformation of the machine itself, wherein the form and length of the aforesaid body, as well as also the length of the machine frame, the deformation of which is to be compensated, may be as desired; and further, wherein the measuring section may be disposed as desired, especially in accordance with the desirable elimination of secondary bending in or near the deformation axis.

In accordance with one important aspect of the invention the measuring section, and as the case may be, the signal generator provided therefor, are independent of the length of the test piece and the machine frame. Such prerequisites are of particular importance, if, for example, a press machine or a material testing machine must be controlled with respect to speed or rate of deformation.

The present invention is generally characterized in that, the effective test load or force in the form of a suitable "signal," electrical or otherwise, as well as the measured elasticity constant or spring rate of the machine frame between the points of surface contact with the workpiece, are introduced into a model system in which the elasticity constant and test load signal are multiplied and the product of this multiplication is removed from the model as a proportional value of the elastic deformation of the machine frame. This information concerning the deformation of the machine frame ascertained at the model system is supplied to a measuring section, which contains information regarding the total deformation of machine frame and test piece, in such a manner that, through the introduction of the aforesaid determined product or information derived at the model system into the measuring section the true deformation of the test piece can be readily ascertained. Moreover, the model system is constructed from transmission members which in dependence upon adjustable and/or automatically self-setting values or dimensions delivers a signal which fulfills the desired proportionality.

More specifically, the compensation apparatus according to the invention for compensating for the elastic deformation of a machine, particularly a material testing machine for testing the physical behavior of test specimens, advantageously comprises a machine frame, measuring section means for measuring the deformation of the test specimen and the machine frame, means for applying a test load to the test specimen. Additionally, there is provided a device for generating a signal regarding the test load applied to the test specimen and the machine frame as well as compensator means including a model system of the machine frame into which said test load signal from said signal generating device is delivered and processed such that an output signal appears at said compensator means indicative of the actual deformation of said machine frame. According to one aspect of the invention, the compensator means includes means for transforming said test load signal into a signal proportional to the deformation of the machine frame due to the test load, means for changing said proportional signal into a signal representing the actual deformation of said machine frame, and means to deliver the actual deformation signal to said measuring section means, to thereby compensate for the deformation of the machine frame measured at said measuring section means. There are also disclosed herein compensator means constructed such that machine frame deformation is ascertained by a displaceable member of said compensator means.

Further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 schematically illustrates a horizontally disposed compression-testing machine provided with a control circuit and an electronic compensator;

FIGURE 2 illustrates a material testing machine having a measuring section and provided with a hydraulic compensator;

FIGURE 3 illustrates details of a modified form of compensator provided with a model system and means for adjusting or varying the elasticity or spring constant;

FIGURE 4 illustrates a further embodiment of compensator for automatically adjusting or varying the elasticity constant; and FIGURE 5 illustrates another variant form of compensator provided with a transmission-type drive for varying the elasticity constant.

Describing now in detail the drawings, and with specific attention first directed to the embodiment of FIGURE 1, it will be seen that a crossbar 1 interconnects two rods 17 which are rigidly connected with a travelling carriage 12. The carriage 12 is provided with wheels 15 and is displaceable in a closed frame 5. The frame 5 embodies the girders or columns 16 and the yokes or end wallpieces 5a, 14. A test piece or body 13 is clamped between the front face 12a of the displaceable carriage 12 and the opposite situated end wall 14a, in the manner shown in this figure.

According to the invention the problem should be solved of determining the true deformation of the test body 13 externally of the test section A of the apparatus. This determination is employed in the present example to maintain the feed or advancing speed of the travelling carriage 12 with respect to the end wall 14a constant, within narrow limits, and under appreciable elimination of the influence of the resulting reaction of the test body 13.

As can be seen, a toothed rack 2 is disposed at the left-side of the machine coaxially to the test section A of the apparatus at which is clamped the test body or workpiece 13. The relative movement of this toothed rack 2 with respect to the frame 5 is transmitted to a shaft 3a provided with a pinion 3. The support for the aforesaid shaft 3a is formed by the journal arms 4 connected with the frame 5, in the manner shown. This relative movement corresponds to the deformation of the workpiece 13 appearing at the test section A of the apparatus, enlarged by the elastic elongation of the columns 16 and the bending of the end walls 5a and 14a of the frame 5.

The test force or load is derived by infeeding oil under pressure into the compartment 6 of the cylinder 6a. This oil or pressurized medium acts against a piston 7 slidably disposed in the cylinder 6a, as well as the piston rod 6b and the piston 10 arranged in a cylinder 10a of the carriage 12. The cylinder 10a is also conveniently filled with a fluid medium, such as oil, and the thus displaced piston 10 places under stress the oil contained within the compartment 11 providing together with the flexible conduit line 21a a device for generating and delivering "signals" ir information, here initially in the form of oil pressure, to a compensator 55 including a model system of the machine frame as will be more fully explained hereinafter. The oil in compartment 11 also transmits its pressure to the carriage 12 mounted upon the wheels 15 for easy displacement. As should be apparent, the compartments 8 and 9 of the cylinders 6a and 10a, respectively, serve for retracting the carriage 12 from the test body 13.

The relative movement between the toothed rack 2 and the frame 5, expressed in terms of the angular rotation of the shaft 3a, is applied to a measuring section arrangement, generally designated at 28a, and incorporating an externally supplied synchro-generator 18, for example a known Selsyn generator. The synchro-generator 18 drives still a second, externally supplied synchro-generator 26 via a gear train 22 such that the synchro-generator 26 delivers signals of a higher frequency than those from synchro-generator 18. In other words, the relative movement in the measuring section 28a of the members 2 and 3 is depicted electrically by a number of signals shifted 120° in phase, the low frequency signals emanating from the synchro-generator 18 and those of high frequency from the synchro-generator 26. The low and high frequency signals from the synchro-generators 18 and 26, respectively, are supplied to a known phase discriminator 28, for reasons to be explained shortly hereinafter.

A synchronous motor 37 furnished with a suitable source of power, as shown generally at 52, drives an externally supplied synchro-generator 30, for high frequency or finely divided signals via a mechanical speed-change mechanism or friction drive comprising a displaceable friction wheel 39 mounted for sliding movement upon the shaft 38 and drivingly engageable with a friction disk 39a carried on a shaft 36 of the synchro-generator 30. This synchronous motor 37 simultaneously also drives a further synchro-generator 32 for lower frequency or coarsely divided signals via the shaft 36 and gear train 31, as shown. The phase relationship between the finely divided or high frequency signals and the coarsely divided or low frequency signals is determined in the phase discriminator 28. The deviations of such phase relationship is transposed into a direct current signal which is proportional to the aforesaid deviation or phase shift. The phase discriminator 28 is a well known circuit to those skilled in the art, and for such reason details thereof need not be explained more fully.

The aforesaid signal of the phase discriminator 28, corresponding in polarity and magnitude to the momentary difference between the "reference value," representing a selected rate of deformation of the test piece 13 and which is adjustable or set at the synchronous motor 37 and the friction drives 36, 38 and 39, and the "actual value" of the rate of deformation of test piece and machine frame as measured by the toothed rack 2 and pinion 3, is supplied via the electric lead line 50 to an amplifier 49, the output of which is connected to a positioning control motor or servomotor 35.

The servo-motor 35 displaces a hydraulic slide control or servovalve arrangement 29 via a gear-rack drive 40. The hydraulic slide control 29 supplies a pressurized fluid medium, such as oil, from an auxiliary pump 33 to a servo-cylinder 20. The oil is fed from and returned to the auxiliary pump 33 via the conduits 34. In accordance with the direction of movement of the positioning control motor or servo-motor 35 and this hydraulic servo-system, it is possible to adjust, via the linkage 23, a regulating pump 19 as regards its feed rate, in a manner which will be readily apparent to those versed in the art. Advantageously, the main regulating pump 19 and the auxiliary pump 33 are driven by a suitable electric motor 27.

By virtue of the above-described arrangement an error appearing between the aforesaid reference value and actual value is compensated. For example, if the actual value is leading, then the oil supply or feed rate from regulating pump 19 is reduced and if it is lagging then it is increased. The illustrated embodiment, in a practical application, must still of course be furnished with several return lines which, for convenience in illustration, have here not been shown, as the failure to do such does not detract from an understanding of the invention.

It will be appreciated, however, that the illustrated automatic control or regulation is erroneous, since the elastic deformation of the machine frame of the testing machine has also been measured, and thereby with a load or force increase too large a deformation speed has been simulated and with a load reduction too small a deformation speed has been simulated. In accordance with the invention this error factor is eliminated by means of a so-called compensator, generally indicated at 55, which embodies an analogous model system of the test machine frame, and in which the test load applied to the machine frame and the elastic deformation constant thereof are multiplied, as will now be described. The test load is supplied via the flexible conduit 21a from the test load signal-generating compartment 11 to an analyzer or diaphragm box 21. This test load, represented by the pressure of the oil in conduit 21a, produces an elastic deformation at a membrane or diaphragm 25 operatively connected with a rod 56 which is accordingly displaced to the left of FIGURE 1 in proportion to the test load. The unit 21 may be considered a model system of the machine or machine frame insofar as applied force gives a linear deformation of the membrane 25 which is exactly proportional to the machine frame deformation under load.

The displacement of the rod 56, which is accordingly proportional to the test load, is transmitted to a differential transformer incorporating a ferrite core 54 mounted upon the rod 56, and oppositely wound toroidal coils or ring spools 41 and 43 supplied with alternating current at 53. Furthermore, between these ring spools 41 and 43 there is located a pick-up coil 42 which, depending upon the position of the ferrite core 54, has more or less strongly impressed thereon the resulting magnetic or inductive coupling with the spools 41 and 43. The thus produced weak sinus-shaped voltage or signal is delivered to a bridge circuit 46a incorporating resistors 45 and diodes 46, the conductivity time of which can be controlled by a suitable transformer 44. At the junction point of the diodes 46 there thus appears a direct current voltage, the amplitude of which corresponds to the displacement of the ferrite core 54 from its central position, and the polarity of which denotes whether such displacement has taken place to the right or the left. This direct current voltage value is then delivered to the input of an amplifier 47, the power amplification or gain of which can be fixedly regulated or adjusted by a negative feedback potentiometer 48, as will again be mentioned shortly. The resulting direct current voltage is supplied via the electric lead 51 to the phase discriminator 28 and is superimposed upon the there formed phase differential direct current voltage, previously explained. As a result, the control signal appearing at the output side of the phase discriminator 28 becomes zero or null while a difference still exists between the reference value and the actual value. This difference corresponds to the elastic deformation of the machine frame at the measuring section 28a, and which has been compensated by the construction of the compensator 55 hereindescribed.

There may arise the question if it would not be considerably simpler to convert the correction or compensation value or factor for the machine frame deformation into a mechanical displacement movement. Further embodiments of the invention working on this principle will be shortly described hereinafter. The particular advantage of an electronic compensator resides in the fact that no additional mechanical movements are necessary at the aforesaid measuring section.

In the illustrated embodiment the pressure acting against the test piece or specimen 13 is transformed with the aid of the test-load signal-generating diaphragm box or analyzer 21 and the differential transformer 41, 42, 43 into a proportional direct current voltage of predetermined polarity and amplitude. The resulting direct current signal is supplied to an amplifier 47 with very high amplification, and by means of the negative feedback potentiometer 48 this amplification may be adjusted to a desired factor. The amplification factor or gain, adjusted at the potentiometer 48, and the magnitude of the direct current signal are multipled together to provide the compensation or correction signal appearing at the electrical lead 51, whereby the spring rate or elasticity constant of the machine frame, or, as the case may be, the proportionality factor between such elasticity constant of the machine frame and the elasticity constant of the model system are manually introduced at the potentiometer 48. It is to be here mentioned that in actual practice the wallpiece 14 would be mouned to be displaceable along the columns 16 in order to accommodate workpieces of varying length, and for such reason the potentiometer is advantageously adjustable in order to compensate for the different elasticity constants of the machine frame with different positions of the wallpiece 14.

By way of summation, it may be seen that the apparatus described in conjunction with FIGURE 1 generally works in the following manner: A test load is applied to the test piece or workpiece 13 via the pistons 7 and 10 and the relative movement between the rack 2 and pinion 3, indicative of the rate of deformation of the machine frame and the aforesaid test piece, is represented in the form of low and high frequency signals which are supplied to the phase discriminator 28. The desired rate of deformation of the test piece 13 is adjusted at the friction drive 36, 38, 39 and such preset deformation rate is likewise represented in the form of low and high frequency signals which are also fed to the phase discriminator 28. This preset rate of deformation of the test piece provides a reference value with which there is compared at the aforesaid phase discriminator the actual value of the rate of deformation of test piece plus machine frame. The difference between the actual value and the reference value, as represented by a phase shift of the compared signals, then corresponds to the deformation of the frame. Such appears as a direct current voltage or error signal of given magnitude and polarity at the output side of the discriminator 28.

In order to eliminate this direct current voltage or error signal the compensator 55 is designed to apply to the phase discriminator 28 via electrical lead 51 a direct current voltage which corresponds to the deformation of the machine frame, but is opposite in polarity to the aforesaid error signal so as to cancel the same, whereby the control signal at the output side of the phase discriminator is zero. More specifically, the model system 21 of the compensator 55 operates such that the displacement of the membrane 25 thereof generates an electric signal which is amplified at the amplifier 47, the adjustable potentiometer 48 being set to the proportionality factor between the elasticity constant of the machine frame and that of the model sysem 21. The direct current signal appearing at the output of the amplifier 47 corresponds to the deformation of the machine frame and is opposite in polarity to the direct current signal for the frame deformation appearing at the measuring section 28a, so as to cancel the latter as explained. As such, it is then readily possible to determine the true deformation of the workpiece 13 or other pertinent data, as desired.

In the embodiments depicted in FIGURES 2 to 5 like characters of reference will be employed for similar or analogous elements.

As was previously mentioned, it would be possible to employ compensator mechanism other than the electronic operating compensator 55 depicted in FIGURE 1. In FIGURE 2 there is depicted a hydraulic compensator embodying an analogous model system of the elastic characteristics of the machine frame in conjunction with a compression-testing machine. The compression testing machine of this embodiment comprises a machine frame, generally designated by reference numeral 100, which incorporates a pair of yokes or wall members 60a and 62. Extending in parallelism to one another from the wall member 62 are columns 58 upon which the movable yoke or wall member 60a is slidably supported, such that it can be moved into desired position, to accommodate test specimens of different length.

The test piece or workpiece 57 is clamped between a pair of pressure plates 70a and 70, as shown. It will be recognized, however, that the pressure plate 70 for the wall member or yoke 62 is connected to a displaceable test load-applying piston 61 slidably disposed within a test load-applying cylinder 60. The cylinder 60 is supplied via feed line 59 with a suitable pressurized medium, such as oil for example, in order to apply the desired test load to the test specimen 57. The lower cylinder chamber or compartment 60b cooperates with a channel 65 to provide a device for generating and delivering information signals regarding the test load, here in the form of pressure, to compensator means, generally designated with numeral 108. A pair of connecting or measuring rods 63 extend from the piston 61 past the yoke or wall member 62 and support at their free ends a plate 64 providing one end of a "measuring section C." The compensator 108 incorporating the model system of the machine frame, in this embodiment comprises a cylinder 67a likewise secured to the lower face of the yoke 62, as shown, in which there is slidably arranged a piston member 67 provided with a piston rod 69 which extends through the cylinder wall 67b, for reasons to be explained shortly. The free end face 69a of the piston rod 69 provides the other end of the aforesaid measuring section C. A spring member 68 is disposed between the lower face of wall member 62 and the confronting face of the piston member 67. It will be recalled that the feed line 59 introduces a pressurized medium into the cylinder 60, the pressure of which corresponds to the test load applied to the test or workpiece 57. The cylinder compartment 60b can conveniently be compared to the compartment 11 of the previous embodiment, both of which function as indicating or generating devices for the test load which deliver such information or "signal" to the model system of the compensator 108. In this case, the pressure appearing in the cylinder 60 is transmitted via the bore or channel 65 to the lower end of the cylinder 67a of the compensator 108.

The model system of the compensator 108 is so dimensioned that with a given face area of the piston 67 with respect to that of the piston 61, the spring 68 is selected such that it possesses a desired spring constant of such magnitude that the lowermost free end 69a of the piston rod 69 can move from its initial "no test-load position" through a distance $x$ which corresponds to the actual deformation of the machine frame. At the same time, it will be appreciated that, when a test load is applied to the test specimen 57, the guide plate 64 of the measuring section C moves from its original or no test-load position towards the free end 69a of the piston rod 69 a distance corresponding to the deformation of the machine frame 100 plus the deformation of the test piece. Consequently, in order to determine the true deformation of the workpiece it is then merely necessary to superimpose, namely to measure the difference between the distance of the no test-load position of the plate 64 and the end face 69a of piston rod 69 and the distance between the new position of plate 64 and the new position of end 69a of the piston rod 69 under test load.

It will be appreciated that in the event the wall member or yoke 60a is moved to a new position, for example for the clamping and testing of a different size test specimen, then the elasticity constant or spring rate of the machine frame 100 will change. In order to compensate for such change, the spring 68, in the embodiment of FIGURE 2, must be replaced with a new spring possessing another spring constant in order to fulfill the requirements indicated above. Rather than encounter the inconvenience of having to replace spring 68 with a new spring of different spring constant each time the movable yoke or wallpiece 60a is displaced, it is possible to provide an arrangement wherein the spring constant can be selectively regulated or adjusted.

In FIGURES 3–5 there are shown compensators, adapted for use in the testing machine of FIGURE 2, where the characteristics thereof may be adjusted in order to accommodate for the various elastic properties of the machine frame when working with different clamping lengths due to displacing the movable yoke or wall member 60a relative to the yoke 62.

In the device shown in FIGURE 3, the compensator 101 including the model system is substantially similar, at least as regards certain basic elements, to that of FIGURE 2 and for this reason like reference numerals have been employed for similar or analogous structural members. It will be seen that a threaded sleeve 72 including an operating knob 72a cooperates with the spring 68 in order to change the free spring length and, therewith, the spring rate or constant. The measuring section C is again defined between the upper face of plate 64 shown in phantom lines and the lower end 69a of piston rod 69.

In FIGURE 4 there is shown a modified form of compensator 102 provided with a model system of the machine frame, wherein like reference numerals generally again designate similar members, and which here incorporates means to automatically adjust the spring rate or constant of a bending spring 74 for different test-piece clamping lengths to the changed elasticity constant of the machine frame. It will be appreciated that, the spring 74 is rigidly connected with the piston 67 and the spring constant thereof is determined by the spacing between the support rollers 75 mounted upon the respective pivotable levers 76. Such spacing between these support rollers 74 can be automatically adjusted by means of the pivotable levers 76, the threaded spindle 77 to which the latter are connected, the pulley or drum 78 and finally the pulley cord 79 which operably extends to the movable yoke or wall member 80. Thus, as the movable wall member 80 is displaced, the threaded spindle 77 is correspondingly rotated to alter the spacing between the support rollers 75 to a corresponding extent, to thereby vary the spring rate or constant of the spring 74. The levers 76 and the support rollers 75 during changing of the effective length of the spring 74 forcibly undergo an axially directed additional component of movement relative to the piston 67, whereby a shift of end 69a of the "measuring section C" due to an intended displacement of the effective length of the machine frame under a given basic pressure in the hydraulic cylinder is compensated. In FIGURE 4, the other end of the "measuring section C," namely plate 64 similar to that of FIGURE 2, for measuring the deformation of test piece and frame has been generally illustrated in dotted lines for convenience in illustration.

In FIGURE 5, where like reference numerals again denote similar elements, the deformation force signal or test load appearing in the form of a pressure signal is multiplied in the compensator 103 provided with model system of the machine frame by a constant spring rate or constant. Whereas, previously in the embodiments of FIGURES 3 and 4, mechanism was disclosed for varying the spring rate or constant of the springs 72 and 74, respectively, in this embodiment the spring constant of the spring 81 is not changed. By means of a transmission system, incorporating the rod 82, lever 83, piston 88 and movable support 84, the transmission ratio of which can be adjusted by means of the threaded spindle 86 and the hand-wheel 87 to displace the pivot point or fulcrum for the lever 83, it is thus possible to multiply or increase the pressure signal in such a manner that with varying clamping lengths, for different size test or workpieces, the displacement of the rod 88 from its initial position representing one end of the "measuring section C" always corresponds to the relevant deformation of the machine frame. Here again, the other end of the "measuring section C" for measuring the total deformation of test specimen and machine frame is schematically depicted in phantom lines by the plate 64.

The teachings according to the invention, particularly in the case of large universal deforming machines, permit a determination of the actual deformation of the test piece or specimen with an apparent unequaled small expenditure of effort than, for example, by removing the source of error, perhaps by employing rigid frames or by stiffening the machine frame itself. By way of completeness, it should here be mentioned that the compensator means disclosed in FIGURES 3–5 can each be employed with the compression testing machine of FIGURE 2 in place of the compensator shown therein.

Naturally, the invention is not only applicable with machines for the deformation of test pieces for the determination of the actual deformation thereof, rather can be employed also to advantage whenever a value having an error associated therewith can be easier corrected by a signal from a model system of the error source than by removal of the error source itself, without departing from the spirit and scope of the invention.

While there is shown and described preferred embodiments of the invention, it is to be distinctly understood that the invention is not limited thereto but may be otherwise variously embodied and practised within the scope of the following claims.

Having thus described the present invention, what is desired to be secured by United States Letters Patent is:

1. Compensation apparatus for compensating for the elastic deformation of a machine, particularly a material testing machine for testing the physical behavior of test specimens, comprising a machine frame mounting said test specimen, means for applying a load to said test specimen and said machine frame, measuring section means for measuring the combined deformation of both said test specimen and said machine frame, compensator means including a model system of said machine frame for generating a signal representing the load applied to said test specimen, said compensator means further including means for generating an output signal representing the actual deformation of said machine frame.

2. Compensation apparatus for compensating for the elastic deformation of a machine according to claim 1; said compensator means including a displaceable piston and spring means cooperating with said piston.

3. Compensation apparatus for compensating for the elastic deformation of a machine according to claim 2; said measuring section means for measuring the deformation of said test specimen and said machine frame comprising a displaceable member operable connected with said test load applying means.

4. Compensation apparatus for compensating for the elastic deformation of a machine according to claim 2; said compensator means further including means for varying the spring constant of said spring means.

5. Compensation apparatus for compensating for the elastic deformation of a machine according to claim 4; said spring constant varying means including a sleeve member cooperating with said spring means to alter the free length thereof.

6. Compensation apparatus for compensating for the elastic deformation of a machine according to claim 4; said spring constant varying means including pivotable levers provided with support rollers bearing against said spring means, and means for automatically adjusting the spacing between said support rollers in accordance with a change in the elasticity constant of said machine frame.

7. Compensation apparatus for compensating for the elastic deformation of a machine according to claim 2; said compensator means including a transmission system for adjustably regulating the effective value of said test load signals applied to said compensator means to accommodate for changes in the elasticity constant of said machine frame.

8. Compensation apparatus for compensating for the elastic deformation of a machine according to claim 7; said transmission system including pivotable lever means operatively associated with said displaceable piston, and means for changing the pivot point of said pivotable lever means.

9. Compensation apparatus for compensating for the elastic deformation of a machine according to claim 1; said compensator means comprising means for transforming said test load signal into a signal proportional to the deformation of the machine frame due to the test load, means for changing said proportional signal into a signal representing the actual deformation of said machine frame and defining said output signal, and means for delivering said output signal to said measuring section means to enable determination of the deformation of the test specimen by compensating for the deformation of the machine frame measured at said measuring section means.

10. Compensation apparatus for compensating for the elastic deformation of a machine according to claim 9; said measuring section means comprising synchro-generator means for delivering electric signals representative of the deformation of the test specimen and the machine frame.

11. Compensation apparatus for compensating for the elastic deformation of a machine according to claim 9; said transforming means including a diaphragm member having applied thereto a force which gives a linear deformation of said diaphragm member which is exactly proportional to the deformation of the machine frame by said test load.

12. Compensation apparatus for compensating for the elastic deformation of a machine according to claim 11; said changing means for said proportional signal including a differential transformer.

13. Compensation apparatus for compensating for the elastic deformation of a machine according to claim 12; said differential transformer incorporating a core member operatively connected with said diaphragm member, a pair of oppositely wound coils, a power source for said coils, and a pick-up coil responsive to the position of said core member.

14. Compensation apparatus for compensating for the elastic deformation of a machine according to claim 12; said changing means for said proportional signal further including a bridge circuit electrically coupled with said differential transformer, an amplifier at the output of said bridge circuit, and means for regulating the gain of said amplifier.

15. Compensation apparatus for compensating for the elastic deformation of a machine according to claim 14; wherein said regulating means of said amplifier comprises an adjustable potentiometer at which may be set the proportionality factor between the elasticity constant of the machine frame and that of said model system.

16. Compensation apparatus for compensating for the elastic deformation of a machine according to claim 10; said measuring section means further comprising a phase discriminator electrically coupled with said synchrogenerator means, and means including further synchrogenerator means electrically coupled with said phase discriminator for setting a desired reference rate of deformation of said test specimen.

17. Compensation apparatus for compensating for the elastic deformation of a machine, particularly a material testing machine for testing the physical behavior of test specimens, comprising a machine frame, measuring section means for measuring the deformation of the test specimen and the machine frame, means for applying a test load to the test specimen, a device for generating a signal representing the test load applied to the test specimen and the machine frame, electronic compensator means including a model system of the machine frame into which said test load signal from said generating device is delivered, said electronic compensator means comprising means for transforming said test load signal into a signal proportional to the deformation of the machine frame due to the test load, means for changing said proportional signal into a signal indicative of the actual deformation of said machine frame, and means for delivering the actual deformation signal to said measuring section, to thereby enable determination of the deformation of the test specimen by compensating for the deformation of the machine frame measured at said measuring section means.

18. Method for compensating for the elastic deformation of the structural components of a machine, particularly a testing machine for the deformation of a workpiece, comprising the steps of; applying a test load to said workpiece supported at said machine, to thereby deform said workpiece and said machine, measuring the deformation of said workpiece and said machine, applying information regarding the test load to a model system of said machine, deriving a measurement of the deformation of said machine at said model system from said test load information, and utilizing said derived machine deformation measurement in conjunction with said measured deformation of workpiece and machine in order to compensate for the machine deformation, so as to be able to thereby determine the actual deformation of said workpiece.

19. Method for compensating for the elastic deformation of the structural components of a machine, particularly a testing machine for the deformation of a workpiece, comprising the steps of: generating electric signals representing the rate of deformation of the machine and the workpiece in a measuring section, comparing these generated electric signals in said measuring section with electric signals representing a selected rate of deformation of the workpiece, deriving from such comparison an electric signal in accordance with the difference in phase of the aforesaid generated electric signals and the aforesaid electric signals representing the selected rate of deformation of the workpiece, generating in a model system of the machine an electric signal which is proportional to the deformation of the machine and multiplying said last-mentioned proportional generated electric signal by a proportionality factor between the elasticity constant of the machine and the elasticity constant of the model system to obtain a correction signal corresponding to the deformation of the machine, and superimposing the correction electric signal of the model system with the derived phase-difference electric signal of said measuring section so as to cancel one another, to thereby compensate for the machine deformation.

20. Compensation apparatus for compensation of the elastic deformation of a machine, especially a material testing machine for testing the physical behavior of test specimens, comprising a machine frame, a model system of the machine frame which is considerably smaller and independent of said machine frame, means for applying a test load to the test specimen and machine frame, means for applying a load to said model system which is a true fractional value of said test load, means for measuring the deformation of the model system of the machine frame, means for measuring the total deformation of the test specimen and machine frame, and means for transmitting the measured deformation of the model system as a compensation value to the measuring means for the total deformation of test specimen and machine frame.

21. Compensation apparatus for compensation of the elastic deformation of a machine, particularly a material testing machine for testing the physical behavior of test specimens, comprising a machine frame, a model system of the machine frame which is considerably smaller and separate from said machine frame, means for applying a test load to the test specimen and machine frame, means for applying a load to said model system which is an actual fractional value of said test load, means for measuring the deformation of the model system of the machine frame, means for altering the elastic behavior of the model system so as to conform to alterations in the elastic behavior of the machine frame when working with different size test specimens, means for measuring the total deformation of the test specimen and machine frame, and means for transmitting the measured deformation of the model system as a compensation value of proper magnitude to the measuring means for the total deformation of test specimen and machine frame.

References Cited
UNITED STATES PATENTS 2,303,596 12/1942 Zeitlin _____ 73—88
2,864,253 12/1958 Lenton _____ 73—94

OTHER REFERENCES

Martens: Trans. by Henning, Handbook of Testing Materials, Part 1, text, page 59, Wiley & Sons, 1899.

RICHARD C. QUEISSER, *Primary Examiner.*

G. M. GRON, J. J. SMITH, *Assistant Examiners.*